(12) United States Patent
Gebhart et al.

(10) Patent No.: US 12,030,966 B2
(45) Date of Patent: Jul. 9, 2024

(54) CENTRIC SPRAY PIPE

(71) Applicant: Lummus Novolen Technology GmbH, Mannheim (DE)

(72) Inventors: Hermann Gebhart, Böhl-Iggelheim (DE); Franz Langhauser, Ruppertsberg (DE); Oliver Ruhl, Frankfurt (DE); Olli Torma, Houston, TX (US)

(73) Assignee: Lummus Novolen Technology GmbH, Mannheim (DE)

( * ) Notice: Subject to any disclaimer, the term of this patent is extended or adjusted under 35 U.S.C. 154(b) by 336 days.

(21) Appl. No.: 17/425,828

(22) PCT Filed: Jan. 24, 2019

(86) PCT No.: PCT/US2019/014917
§ 371 (c)(1),
(2) Date: Jul. 26, 2021

(87) PCT Pub. No.: WO2020/153959
PCT Pub. Date: Jul. 30, 2020

(65) Prior Publication Data
US 2022/0298266 A1    Sep. 22, 2022

(51) Int. Cl.
  *C08F 2/01*   (2006.01)
  *B01J 4/00*   (2006.01)
  *B01J 4/02*   (2006.01)
  *B01J 19/26*  (2006.01)
  *C08F 10/06*  (2006.01)

(52) U.S. Cl.
  CPC .............. *C08F 2/01* (2013.01); *B01J 4/002* (2013.01); *B01J 4/02* (2013.01); *B01J 19/26* (2013.01); *C08F 10/06* (2013.01); *B01J 2219/00182* (2013.01); *B01J 2219/0036* (2013.01)

(58) Field of Classification Search
  None
  See application file for complete search history.

(56) References Cited

U.S. PATENT DOCUMENTS

| | | | |
|---|---|---|---|
| 4,758,261 A * | 7/1988 | Parker | C01B 25/28 71/34 |
| 6,036,116 A * | 3/2000 | Bui | B22D 11/1246 239/432 |
| 8,544,827 B1 | 10/2013 | Tovani et al. | |
| 2002/0050072 A1 * | 5/2002 | Akimoto | F26B 5/06 34/92 |
| 2003/0096923 A1 | 5/2003 | Chamayou et al. | |
| 2010/0256803 A1 | 10/2010 | Cottard et al. | |

(Continued)

FOREIGN PATENT DOCUMENTS

| | | |
|---|---|---|
| JP | 2003-526502 A | 9/2003 |
| WO | 9718888 A1 | 5/1997 |

OTHER PUBLICATIONS

Examination Report issued in Indian Application No. 202127033738, mailed on Sep. 27, 2022 (6 pages).

(Continued)

*Primary Examiner* — Tam M Nguyen
(74) *Attorney, Agent, or Firm* — Osha Bergman Watanabe & Burton LLP (57) ABSTRACT

A centric spray pipe apparatus is disclosed, The centric spray pipe includes a plurality of nozzles designed to provide full coverage of liquid spray to a vessel.

21 Claims, 5 Drawing Sheets

(56) References Cited

U.S. PATENT DOCUMENTS

| | | | |
|---|---|---|---|
| 2011/0069453 A1* | 3/2011 | Campbell | H05K 7/203 361/700 |
| 2021/0354149 A1* | 11/2021 | Tayebali | B05B 1/3402 |
| 2022/0298266 A1* | 9/2022 | Gebhart | B01J 19/0066 |
| 2023/0349173 A1* | 11/2023 | Winter Von Adlersflügel | E04C 5/04 |

OTHER PUBLICATIONS

International Search Report issued in International Application No. PCT/US2019/014917 dated Sep. 2, 2019 (3 pages).

Written Opinion issued in International Application No. PCT/US2019/014917 dated Sep. 2, 2019 (6 pages).

Office Action issued in Japanese Application No. 2021-543196, mailed on Aug. 30, 2022 (7 pages).

* cited by examiner

CENTRIC SPRAY PIPE

FIELD OF THE DISCLOSURE

Embodiments disclosed herein relate generally to a centric spray pipe that can provide shelter to measurement devices and also provide a distribution of liquids within a vessel. Embodiments disclosed herein also relate generally to methods of utilizing the centric spray within a polymerization reactor.

BACKGROUND

The production of propylene polymers may be carried out in any common reactor suitable for the polymerization of alk-1-enes, either batch-wise or, preferably, continuously, i.e., in solution, as suspension polymerization including the bulk polymerization in liquid monomer or as gas phase polymerization. Examples of suitable reactors include continuously operated stirred reactors, loop reactors, fluid bed reactors, or horizontal or vertical stirred powder bed reactors.

The molecular weight of the resulting polymers may be controlled and adjusted over a wide range by adding polymer chain transfer or termination agents as commonly used in the art of polymerization, such as hydrogen. In addition, an inert solvent, such as toluene or hexane, or an inert gas, such as nitrogen or argon, and smaller amounts of a powdered polymer, e.g., polypropylene powder may be added.

Vertical stirred gas-phase reactors may use a bottom mounted helical stirrer or have an agitation system composed of radially curved blades mounted on a central shaft. In some reactors using the above-mentioned agitators, catalyst suspended in liquid monomer is injected into the top or the side of the reactor, and the powder flows downward under the influence of gravity and expansion of the polymer particles as they grow. Heat from the reactor may be removed via a Recycle Gas (RG) stream that evaporates in the reactor, condenses in an external condenser and recycles back to the reactor continuously. The temperature in the reactor may be maintained above the dew point of the returning gas to prevent pooling of liquid monomer at the bottom of the reactor. Liquid pooling may cause uncontrolled polymerization, forming lumps and chunks that can block the outlet of the reactor. The liquid monomer may be used to absorb the heat of reaction via condensed mode cooling.

In a polyolefin reaction system, heat removal of the highly exothermic reaction is a procedure that often determines the stability and integrity of the overall plant operation. The liquid monomer may be fed to the top of the reactor by means of one or two full cone spray nozzles. These nozzles apply the liquid monomer to a part of the total powder surface, only. Variations in the coolant requirements can cause fluctuating flows and accordingly affects the distribution of the coolant. Uneven coolant distribution can reduce the effectiveness of the reactor control.

SUMMARY OF THE DISCLOSURE

In one aspect, embodiments disclosed herein relate to an apparatus for measuring levels in a polymerization reactor and also providing a liquid for evaporative cooling. In another aspect, embodiments disclosed herein relate to a method of cooling a polymerization reactor.

In another aspect, embodiments disclosed herein relate to an apparatus including a distributor and a guide tube. The distributor may include an upper first section having a plurality of spray nozzles; a lower second section. The guide tube may be disposed within and traverse the length of the distributor. One or more measurement devices disposed within a portion of the guide tube disposed within the second section.

The plurality of spray nozzles may include a first level of spray nozzles at a first height along the upper first section; a second level of spray nozzles at a second height along the upper first section; and a third level of spray nozzles at a third height along the upper first section.

In some embodiments, the first level of spray nozzles may include a plurality of first nozzles spaced equidistant about the circumference of the upper first section and arranged in a single layer at a first height of the upper first section. The first level of spray nozzles may be fan nozzles, for example. Further, in some embodiments, the first level of spray nozzles have an angle in the range from about 60° to about 80° from a longitudinal axis of the distributor.

In some embodiments, the second level of spray nozzles may include a plurality of second nozzles spaced equidistant about the circumference of the upper first section. The plurality of second nozzles may be arranged at a plurality of heights spaced equidistant along the axial length of the second height along the upper first section, for example. Further, in some embodiments, the plurality of second nozzles may include a first layer of second nozzles at a first height along the upper first section, a second layer of second nozzles at a second height along the upper first section and a third layer of second nozzles at a third height along the upper first section. The first layer of second nozzles, the second layer of second nozzles, and the third layer of second nozzles may be offset from each other. In some embodiments, the second level of spray nozzles comprises straight jet nozzles. Further, the plurality of straight jet nozzles in the second level may have an angle in the range from about 30° to about 60° from a longitudinal axis of the distributor, for example.

In some embodiments, the third level of spray nozzles may include a plurality of third nozzles spaced equidistant about the circumference of the upper first section. The plurality of third nozzles may be arranged at a plurality of heights spaced equidistant along the axial length of the third height along the upper first section, in some embodiments. Further, the plurality of third nozzles may include a first layer of third nozzles at a first height along the upper first section, a second layer of third nozzles at a second height along the upper first section and a third layer of third nozzles at a third height along the upper first section. In some embodiments, the first layer of third nozzles, the second layer of third nozzles and the third layer of third nozzles may be offset from each other. The third level of spray nozzles may be straight jet nozzles, and in some embodiments, the plurality of straight jet nozzles in the third level may have an angle in the range from about 30° to about 60° from a longitudinal axis of the distributor.

In some embodiments, the first upper section is fluidly isolated from the second lower section. A dividing plate may be provided, which may also include a hole for passage of the guide tube. One or more seals may be provided to seal around guide tube 8, so as to prevent flow of fluid from the upper chamber to the lower chamber. In some embodiments, a vent hole may be provided in the portion of the guide tube disposed within the second section.

In another aspect, embodiments disclosed herein relate to a polymerization system. The polymerization system may include a polymerization reactor comprising a centric nozzle in a reactor head. An apparatus including a distributor and a guide tube, such as described above, may be disposed within the centric nozzle and may extend into the polymerization reactor. In some embodiments, a radiometric source may be located within the measuring guide tube.

In another aspect, embodiments disclosed herein relate to a solid-vapor polymerization process. The process may include feeding a monomer to a reactor, and reacting the monomer to produce a polymer. The process may further include feeding a recycle gas to the reactor via the apparatus including a distributor and a guide tube, such as described above, where the recycle gas penetrates the polymer. In some embodiments, the recycle gas may be distributed via a first concentric spray circle from the first a first level of spray nozzles, via a second concentric spray circle from the second level of spray nozzles, and via a third concentric spray circle from the third level of spray nozzles.

Other aspects and advantages will be apparent from the following description and the appended claims.

DETAILED DESCRIPTION

Embodiments of a centric spray device are intended to distribute a liquid from the top of reactor vessel and provide full coverage across the cross-section of a vessel. In particular, embodiments of a centric spray device may distribute recycle gas uniformly into a polymer powder from the top of a vertical stirred gas phase reactor.

In one aspect, embodiments disclosed herein relate generally to a centric spray pipe and methods for utilizing the centric spray pipe in polymerization reactors. More specifically, embodiments disclosed herein relate generally to polymerization reactors that can be cooled utilizing the centric spray pipe to increase stability and integrity of the overall plant reaction.

Figure 1A:
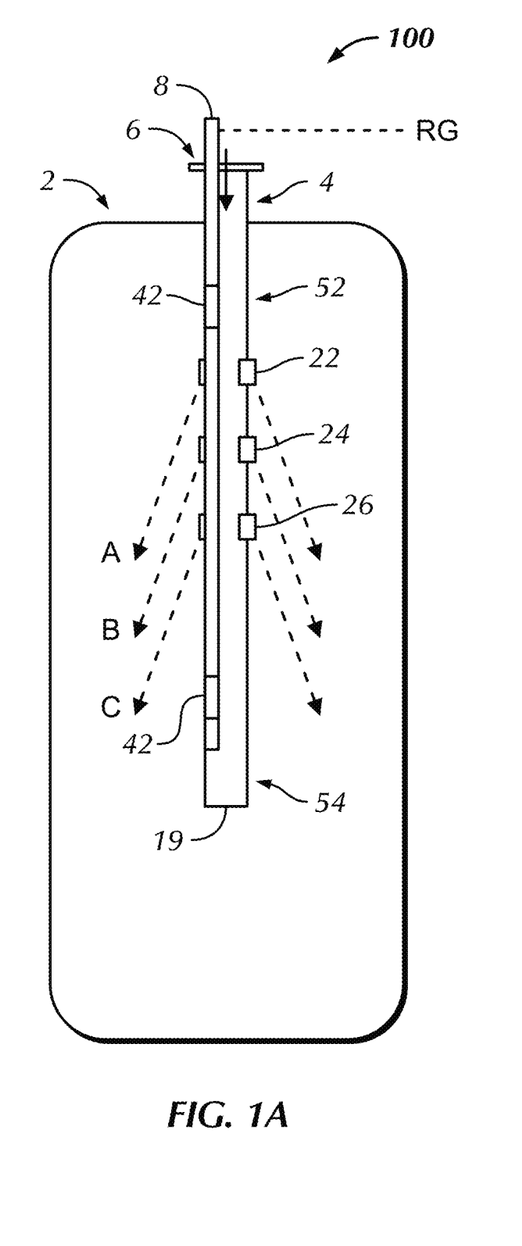
FIG. 1A is a schematic view of a vessel including a centric spray pipe according to embodiments herein.

FIG. 1 illustrates an embodiment of a vessel 100 including a top bead 2 having a centric spray pipe 4 located therein. The centric spray pipe 4 may be located within a nozzle 6 in the approximate center of the top head 2. The centric spray pipe 4 may be a pipe having an inner diameter in the range from about 1 inch to about 18 inches, such as from about 1.5 inches to about 12 inches, or from about 4 inches to about 10 inches. In some embodiments, the centric spray pipe 4 may have a thickness sufficient to handle forces of the moving powder inside of a reactor. In some embodiments, the length of the centric spray pipe 4 may be in the range from about 0.5 foot to about 20 feet, such as from about 1 foot to about 18 feet, from about 2 feet to about 16 feet, or from about 4 or 6 feet to about 12 feet. One of ordinary skill in the art will be able to determine the desired pipe properties based on the size and service of the vessel 100.

A guide tube 8 may be disposed within centric spray pipe 4 and may traverse along the length of the centric spray pipe 4. As disposed within the centric spray pipe 4, the guide tube 8 is shielded from the contents of vessel 100. Guide tube 8 may traverse the entire length of, or only a portion of, the centric spray pipe 4. Additionally, the guide tube 8 may be centered within spray pipe 4, or may be offset.

In some embodiments, the guide tube 8 may include one or more sensors 42 for measurement. In some embodiments, the sensors 42 may be used for level measurement, temperature measurement or for monitoring the quality of the product in the vessel 100. In some embodiments, the sensors 42 may be or may include a plurality of radiometric sources or detectors. The radiometric sources or detectors, for example, may be disposed within the tube, such as scintillation crystals connected by optical fiber to a measurement system, where the detectors and/or sources may be spaced along a portion of the guide tube 8 to provide measurement of the level of solids or powder in the vessel 100 during operation of the vessel. In some embodiments, the guide tube 8 may be sealed off from the vessel 100 and the centric spray pipe 4.

The centric spray pipe 4 may have a plurality of nozzles 22, 24, 26 disposed along a length, or a select portion, of the centric spray pipe 4. For example, as illustrated in FIG. 1, the centric spray pipe 4 may include an upper portion 52 and a lower portion 54. The nozzles 22, 24, 26 may be located, in some embodiments, only along a portion of the centric spray pipe, such as between upper and lower portions 52, 44. Similarly, sensors 42 may be disposed along the length of the centric spray pipe 4 within guide tube 8, or may be located, in some embodiments, only along a portion, such as above and/or below the elevation of the spray nozzles 22, 24, 26.

Figure 1B:
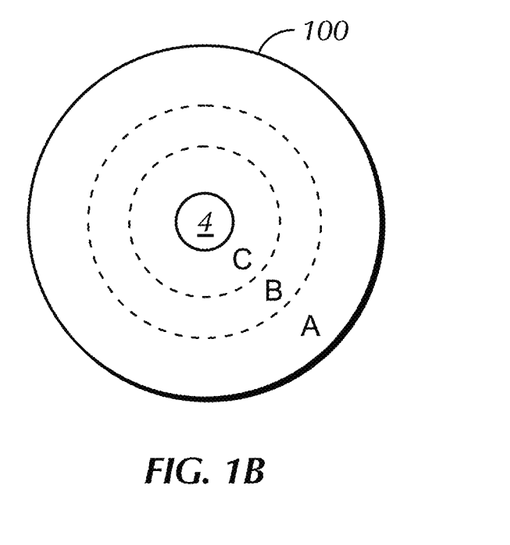
FIG. 1B is a detailed enlarged cross-sectional view of the vessel including a centric spray pipe according to FIG. 1A.

In some embodiments, the centric spray pipe 4 may have a plurality of spray nozzles 22 at a first height from a top of the centric spray pipe 4, a plurality of spray nozzles 24 at a second height from a top of the centric spray pipe 4, and a plurality of spray nozzles 26 at a third height from a top of the centric spray pipe 4. Condensed recycle gas (RG) or another liquid may be fed into vessel 100 through the centric pipe 4 for distribution via nozzles 22, 24, 26 within vessel 100. The plurality of spray nozzles 22 at a first height from a top of the centric spray pipe 4 may produce a circular distribution of liquid, noted by A. The plurality of spray nozzles 24 at a second height from a top of the centric spray pipe 4 may produce a circular distribution of liquid, noted by B. The plurality of spray nozzles 26 at a third height from a top of the centric spray pipe 4 may also produce a circular distribution of liquid, noted by C. The zone or area of distribution or impact of the liquid may depend upon the level of solids or powder within vessel 100. For example, for a given level of powder below the nozzles, the spray from nozzles 22, 24, and 26 may result in the distribution of concentric rings A, B, C of liquid, respectively, such as illustrated in FIG. 1B. The configuration of the nozzles may be such that the concentric rings are overlapping or non-overlapping.

In some embodiments, the vessel 100 is a vertical stirred gas phase reactor. A vessel 100 of this type may be used, in particular, for producing homogeneous mixtures, for performing reactions between solid and/or liquid and/or gaseous substances, for heating or cooling, for coating particles and similar uses. Its simple construction also permits, of course, processes performed under high pressure or at high temperatures.

Figure 2A:
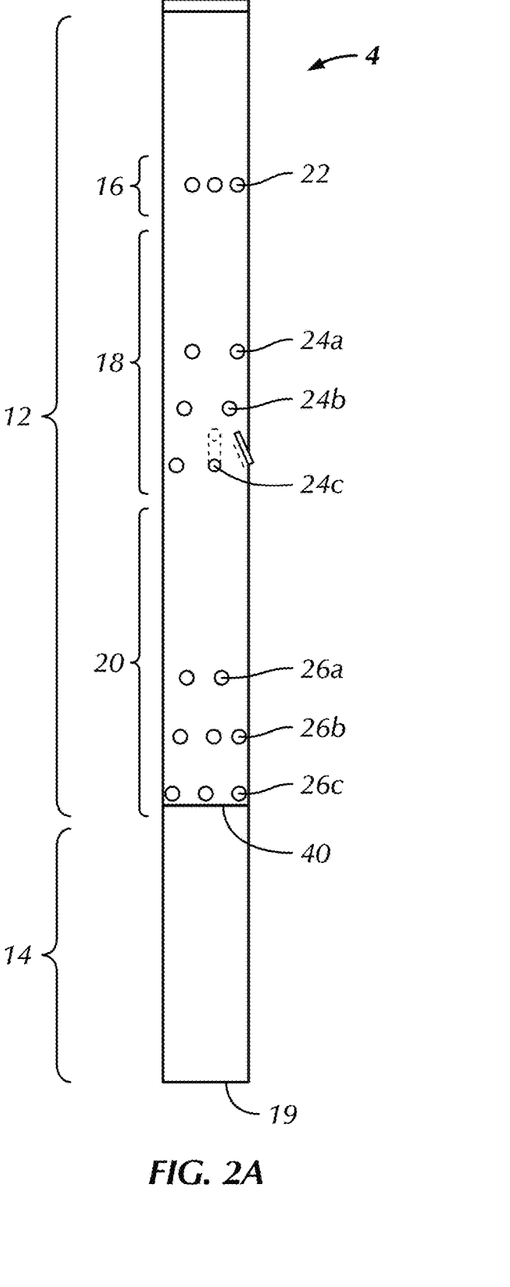
FIG. 2A is a detailed enlarged schematic view of the centric spray pipe according to FIG. 1A.
Figure 2B:
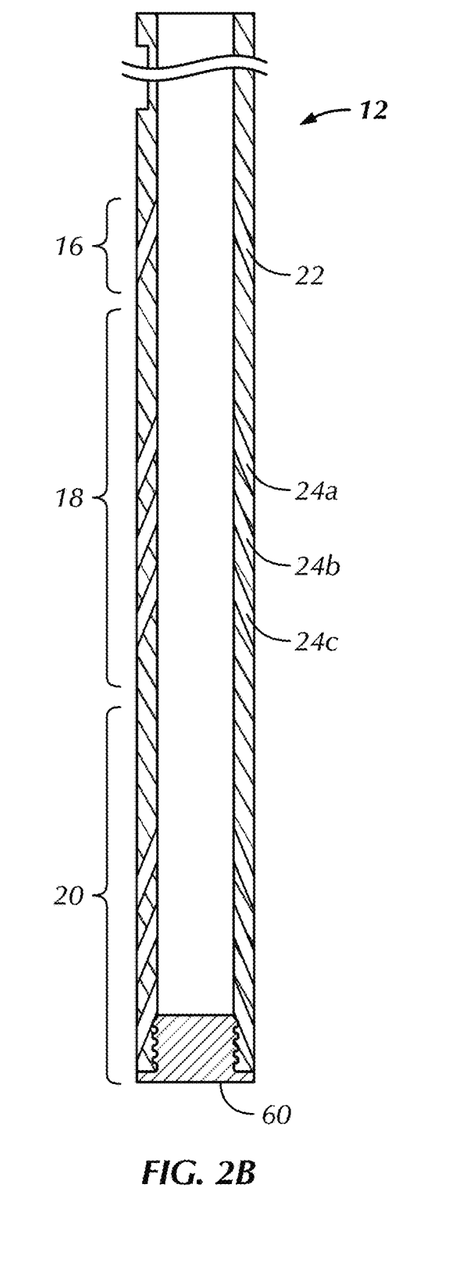
FIG. 2B is a detailed enlarged cross-sectional view of a first chamber centric spray pipe according to FIG. 1A.

In some embodiments, the centric spray pipe 4 may include a first chamber 12 and a second chamber 14. FIG. 2A illustrates cross-sectional schematic view of the first chamber 12 and second chamber 14, and FIG. 2B illustrates a schematic view of the first chamber 12. In some embodiments, the first chamber 12 and the second chamber 14 may be formed from a single pipe. In other embodiments, the first chamber 12 and the second chamber 14 may be separate pipes and coupled together via any coupling method, for example, but not limited to, welding, threaded ends, and others known to those skilled in the art, such as illustrated in FIG. 2B, bottom connector 60 attaching the lower chamber 14 (not shown in FIG. 2B) to first chamber 12.

In some embodiments, the first chamber 12 and the second chamber 14 may be separated by a plate 40, as illustrated in FIG. 2A. The second chamber 14 may be hollow and sealed off from the vessel 100, such as by including a cap or plug 19. The plate 40 and/or the cap or plug 19 may force the flow of fluid out of the nozzles 22, 24, and 26 rather than out the bottom of the centric spray pipe 4, i.e., the path of least resistance. In some embodiments, a vent hole (not shown) may be located in the second chamber, to equalize the pressure between the second chamber 14 and the reactor.

The first chamber 12 may include a first nozzle section 16, a second nozzle section 18 and a third nozzle section 20. The first nozzle section 16, a second nozzle section 18 and a third nozzle section 20 may provide concentric circles A, B, and C of spray across the full cross section of the vessel 100, such as illustrated in FIG. 1B for a given level of solids within the vessel.

Figure 3:
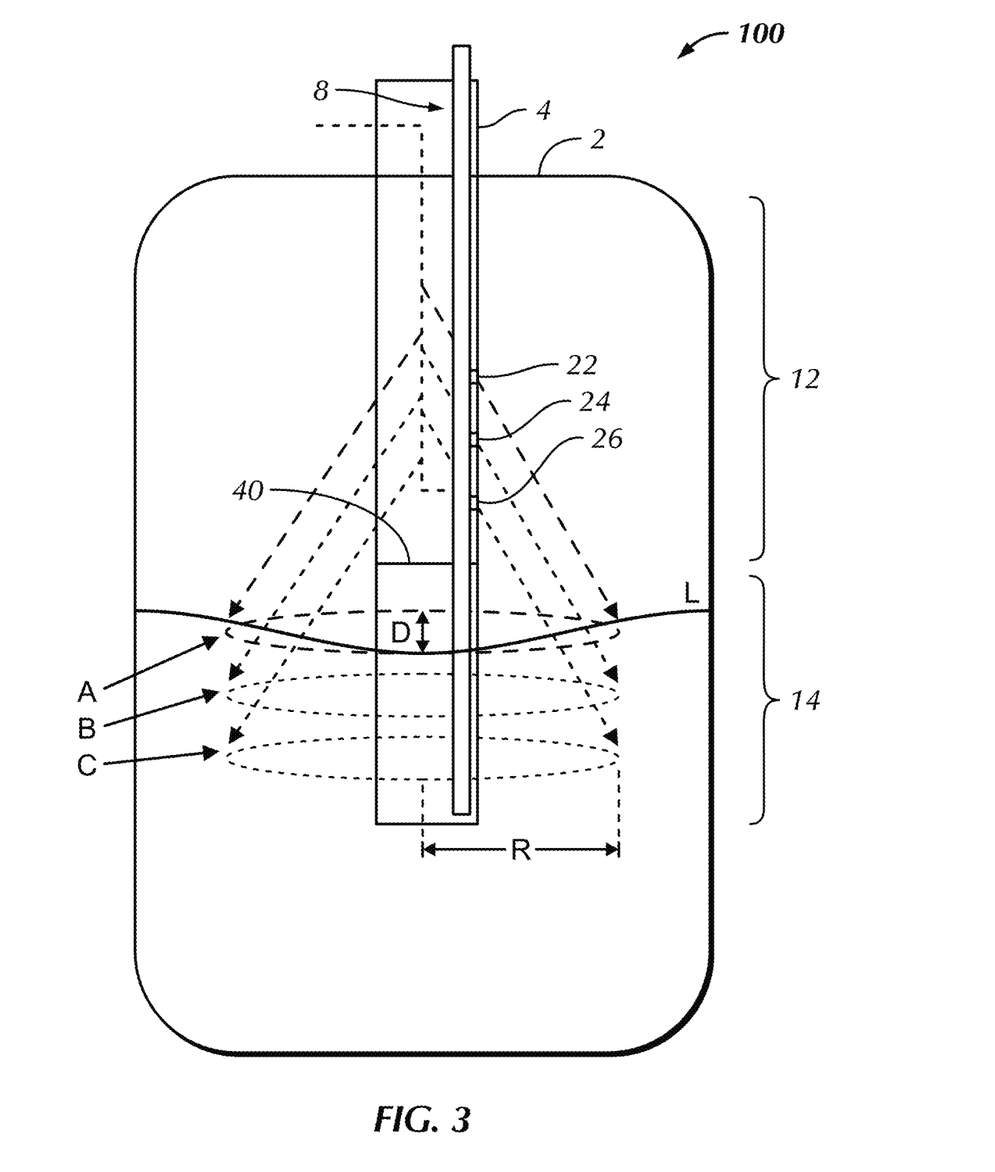
FIG. 3 is a schematic view of the flow pattern from the centric spray pipe according to FIG. 1A in a polypropylene reactor.

The first nozzle section 16 may include a plurality of spray nozzles 22 at a first height from a top of the first chamber 12. The center of the spray nozzles 22 may be located a distance from the top of the first chamber 12, such as in the range from about 2 feet to about 8 feet, and may depend upon the size of the nozzle and of the vessel in which the nozzle is to be disposed. In some embodiments, the plurality of spray nozzles 22 may be spaced equidistant about the circumference of the first chamber 12 in a single layer. The plurality of spray nozzles 22 may be spaced about the circumference of the first nozzle section 16 determined by one of ordinary skill in the art to provide a circular spray pattern A, as shown in FIG. 3. The plurality of spray nozzles 22 are designed to provide the circular spray pattern A having a range of 80 to 100% of the cross-sectional diameter of the vessel 100. The plurality of spray nozzles 22 may be fan nozzles or any type of nozzle determined by one of ordinary skill in the art. The plurality of spray nozzles 22 may have a diameter in the range from about 0.05 inch to about 0.5 inch, for example, however the nozzle diameter and configuration may be determined by the desired spray pattern, flow rates, and pressure drops. The plurality of spray nozzles 22 may all have the same diameter, or the diameter of the plurality of spray nozzles 22 may vary. In some embodiments, the plurality of spray nozzles 22 may be directed away from the top head 2 at an angle in the range from about 15 degrees to about 85 degrees from the longitudinal axis of the centric spray pipe 4, such as at an angle in the range from about 60° to about 80° from a longitudinal axis of the distributor. The configuration and combination of diameters, angles, and other variables may be selected to provide the desired coverage and distribution of liquid within vessel 100.

The second nozzle section 18 may include a plurality of spray nozzles 24 spaced equidistant about the circumference of the first chamber 12. In some embodiments, the plurality of spray nozzles 24 may be spaced equidistant in a plurality of levels. In some embodiments, the number of levels may be three, however, the number of levels may be determined by one of ordinary skill in the art. The plurality of spray nozzles 24 may be spaced about the circumference of the second nozzle section 18 determined by one of ordinary skill in the art to provide a circular spray pattern B, as shown in FIG. 3. The plurality of spray nozzles 24 may be designed to provide the circular spray pattern B having a range of 20 to 80% of the cross-sectional diameter of the vessel 100. The plurality of spray nozzles 24 may be disposed along the length of the chamber such that a portion of the spray nozzles 24a are located a first distance from the top of the first chamber 12, a second portion of the spray nozzles 24b may be disposed a second distance from the top of the first chamber 12, and a third portion of the spray nozzles 24c may be disposed at a third distance from the top of the first chamber, such that nozzles 24a are disposed above nozzles 24b, which are in turn above nozzles 24c. The plurality of spray nozzles 24 may be straight jet nozzles or any type of nozzle determined by one of ordinary skill in the art, such as noted above, to provide a desired spray pattern, flow, and pressure drop profiles. The plurality of spray nozzles 24 may have a diameter in the range from about 0.05 to about 0.5 inch, for example. The plurality of spray nozzles 24 may all have the same diameter, or the diameter of the plurality of spray nozzles 24 may vary according to the location of the spray nozzle 24.

In some embodiments, the first layer of spray nozzles 24a may be directed away from the top head 2 at an angle in the range from about 30° to about 60° from the longitudinal axis of the centric spray pipe 4. In some embodiments, the second layer of spray nozzles 24b may be directed away from the top head 2 at an angle in the range from about 30° to about 60° from the longitudinal axis of the centric spray pipe 4. In some embodiments, the third layer of spray nozzles 24c may be directed away from the top head 2 at an angle in the range from about 30° to about 60° from the longitudinal axis of the centric spray pipe 4. In some embodiments, the angles of the first layer 24a, the second layer 24b, and the third layer 24c may be the same, different or some combination thereof. In some embodiments, the first layer 24a, the second layer 24b, and the third layer 24c are circumferentially offset such that complete coverage of the vessel 100 may be achieved. In some embodiments, the offset between a center of a nozzle of the first layer 24a and a center of a nozzle of the second layer 24b may be in the range from 0.35 to about 2 inches, for example. The offset between a center of a nozzle of the second layer 24b and a center of a nozzle of the third layer 24c may also be in the range from 0.35 to about 2 inches, for example.

The third nozzle section 20 may include a plurality of spray nozzles 26 spaced equidistant about the circumference of the first chamber 12. In some embodiments, the plurality of spray nozzles 26 may be spaced equidistant in a plurality of levels. In some embodiments, the number of levels may be three, however, the number of levels may be determined by one of ordinary skill in the art. The plurality of spray nozzles 26 may be spaced about the circumference of the third nozzle section 20 determined by one of ordinary skill in the art to provide a circular spray pattern C, as shown in FIG. 3. A first layer of spray nozzles 26a may have the center of the spray nozzles 26a located a distance from the top of the first chamber 12 in the range from about 6 feet to about 12 feet. A second layer of spray nozzles 26b may have the center of the spray nozzles 26b located a distance from the top of the first chamber 12 in the range from about 6 feet to about 12 feet. A third layer of spray nozzles 26c may be have the center of the spray nozzles 24c located a distance from the top of the first chamber 12 in the range from about 6 feet to about 12 feet. The plurality of spray nozzles 26 may be straight jet nozzles or any type of nozzle determined by one of ordinary skill in the art. The plurality of spray nozzles 26 may have a diameter in the range from about 0.05 inch to about 0.5 inch, for example. The plurality of spray nozzles 26 may all have the same diameter, or the diameter of the plurality of spray nozzles 26 may vary. The plurality of spray nozzles 26 may all have the same diameter, or the diameter of the plurality of spray nozzles 26 may vary according to the location of the spray nozzle 26.

In some embodiments, the third layer of spray nozzles 26a may be directed away from the top head 2 at an angle in the range from about 30° to about 60° from the longitudinal axis of the centric spray pipe 4. In some embodiments, the second layer of spray nozzles 26b may be directed away from the top head 2 at an angle in the range from about 30° to about 60° from the longitudinal axis of the centric spray pipe 4. In some embodiments, the third layer of spray nozzles 26c may be directed away from the top head 2 at an angle in the range from about 30° to about 60° from the longitudinal axis of the centric spray pipe 4. In some embodiments, the angles of the first layer 26a, the second layer 26b, and the third layer 26c may be the same, different or some combination thereof. In general, the angle of the nozzles may be such that the resulting streams do not cross or collide, and may depend on the vessel diameter. The offset between a center of a nozzle of the first layer 26a and a center of a nozzle of the second layer 26b may be in the range from about 0.35 inch to about 2 inches, for example. The offset between a center of a nozzle of the second layer 26b and a center of a nozzle of the second layer 26c may be in the range from about 0.35 inch to about 2 inches, for example.

In some embodiments, the plurality of nozzles 22, 24, and 26 are evenly spaced along and about the centric spray pipe 4 such that complete or substantially complete coverage of the cross section of the vessel 100 may be achieved when a medium is forced from the plurality of nozzles 22, 24, and 26 in the spray circles A, B, and C, as shown in FIG. 1A.

The centric spray pipe 4 may be used in a polyolefin reaction system, such as a polypropylene reactor 100 shown in FIG. 3. In some embodiments, the polypropylene reactor 100 may be a stirred bed reactor having a bottom mounted agitator. The polypropylene reactor 100 includes a bed of solids extending from a bottom of the vessel up to a level L, which may correspond to one or more of the spray circles A, B, and C around lower section 14. In some embodiments, the centric spray pipe 4 may distribute the condensed recycle gas uniformly into the powder from the top of the reactor.

As illustrated in FIG. 3, guide tube 8 may be disposed within centric pipe 4 and extend through plate 40 into lower second chamber 14. In some embodiments, a vent hole (not shown) may be located in the bottom of the first chamber 12, such as through plate 40, to equalize the pressure between the first chamber 12 and the second chamber 14, thus providing a stagnant liquid in the second chamber 14 for consistent level measurement. In other embodiments, seals (not shown) may be provided to seal around guide tube 8, preventing excess flow of fluid from first chamber 12 to lower chamber 14. For example, sensors 42 may include radiometric sources for level measurement, for consistent level measurement the sources should be surrounded by stagnant liquid within the second chamber 14. Thus, division of the centric pipe 4 into an first chamber 12 sealed from a lower chamber 14 may allow for protection of the level measurement equipment from the solids in the vessel while simultaneously providing for efficient distribution of the liquids into vessel 100. In some embodiments, the guide tube 8 is sealed from contents of both the vessel 100 and the centric pipe 4. In other embodiments, the guide tube 8 may be sealed from first chamber 12 but may include a vent hole (not shown) allowing equalization of the pressure within lower chamber 14 and guide tube 8. The vent hole may be located, for example, at the bottom of the guide tube 8, or guide tube 8 may be an open-ended pipe terminating within lower chamber 14.

As shown in FIGS. 1A and 3, in some embodiments, the recycle gas (RG) may be fed and distributed via the centric spray pipe 4 in circular spray patterns A, B, and C. The centric spray pipe 4 may utilize the existing vessel nozzle 6 and replace the internals therein. The plurality of spray nozzles 22, 24, and 26 may spray the recycle gas from the center of the vessel 100 outward to form circles A, B, and C having a radius (R) of coolant in the powder bed 105 of the vessel 100. The coolant circles may "shower" and cool the maximum amount of powder 105 rising and falling from the impeller into the core region of the vessel 100. The plurality of spray nozzles 22, 24, and 26 may be designed to allow the sprayed recycle gas to penetrate and wet the powder from the bed surface down to a desirable depth (D) beneath the surface, and thus apply direct contact of the liquid cooling medium to a larger fraction of the circulated powder. In some embodiments, the depth of penetration may range from about 50 mm to about 500 mm, such as 100 to 300 mm, or about 200 mm in other embodiments. In some embodiments, centric spray pipe 4 provides better cooling coverage which may provide steady and stable reactor temperature and coolant flow control, which may lead to better overall reactor performance.

EXAMPLES

Figure 4:
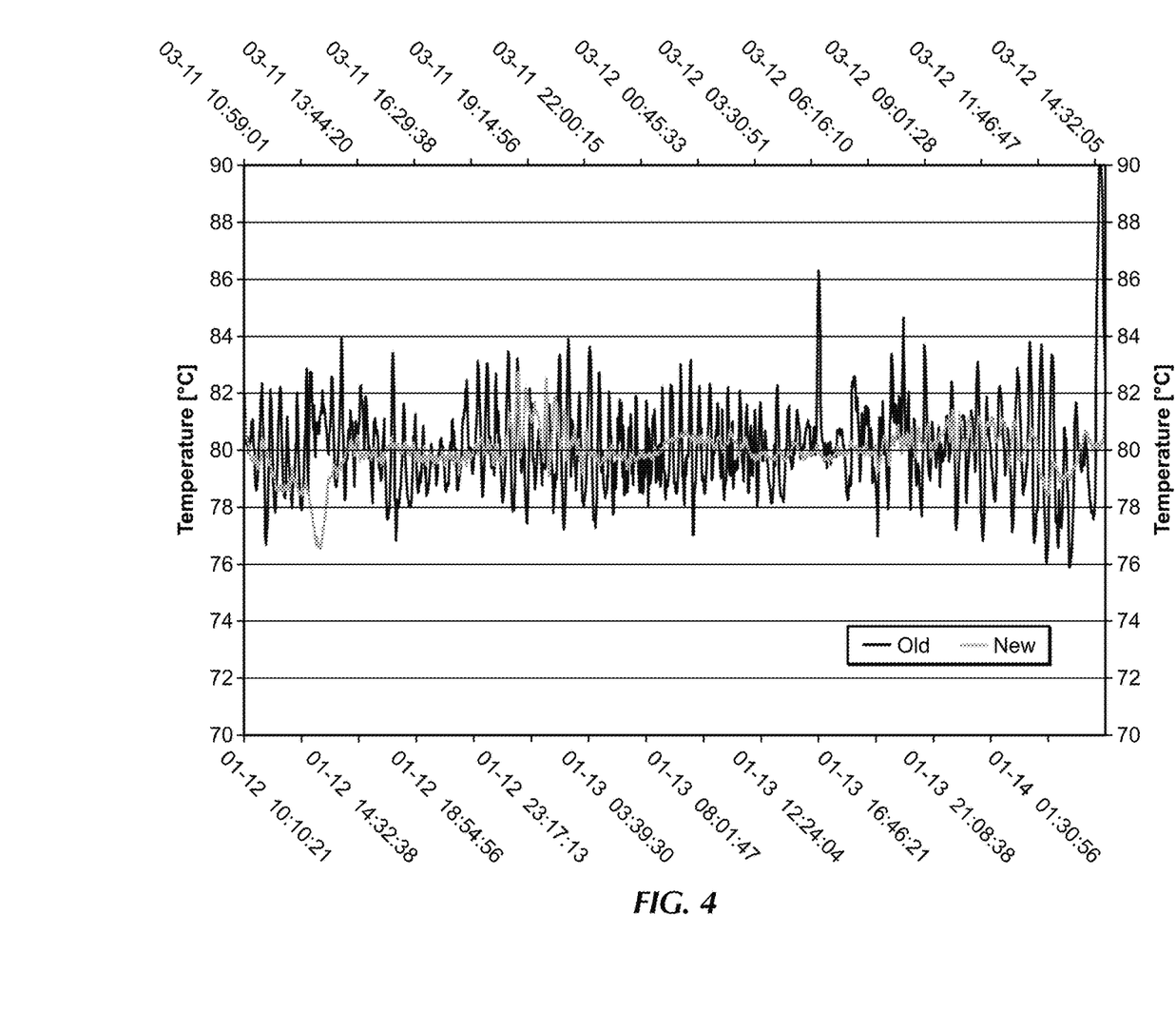
FIG. 4 is a plot of temperature control for a polymer reactor having a centric spray pipe according to embodiments herein.

After installation of a centric spray pipe in a polymer reactor, the standard deviation for the temperature may be reduced from about 1.6° C. down to about 0.7° C. FIG. 4 shows the improved temperature control for a commercial reactor at 23 t/h of polymer production. The variance for the level measurement was reduced from about 7.7% to about 1.1%.

Shown below is a comparison of the standard deviation of temperature and pressure for various nozzles which produce a single spray provided by a full cone nozzle, a semi-symmetrical spray provided by 2 off-centric sprays, and a symmetrical spray as provided by the centric spray pipe 4.

| Standard Deviations in 18 t/h polymer reactor | | |
| --- | --- | --- |
| | Temperature | Pressure |
| Single Spray | 1.1° C. | 0.7 bar |
| Semi Symmetrical | 0.2° C. | 0.13 bar |
| Symmetrical | 0.2° C. | 0.02 bar |

Figure 5A:
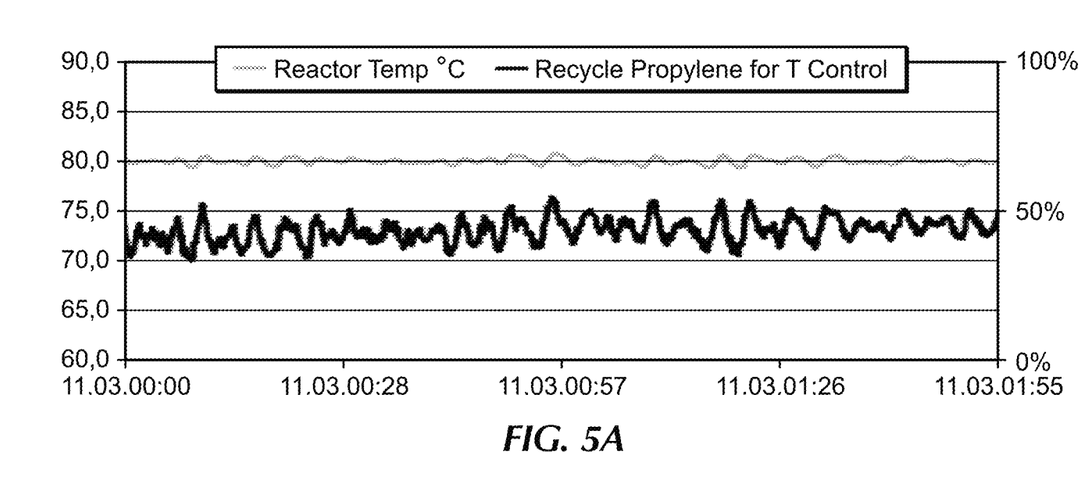
FIG. 5A is a plot of temperature control for polymer reactor having a centric spray pipe according to embodiments herein.
Figure 5B:
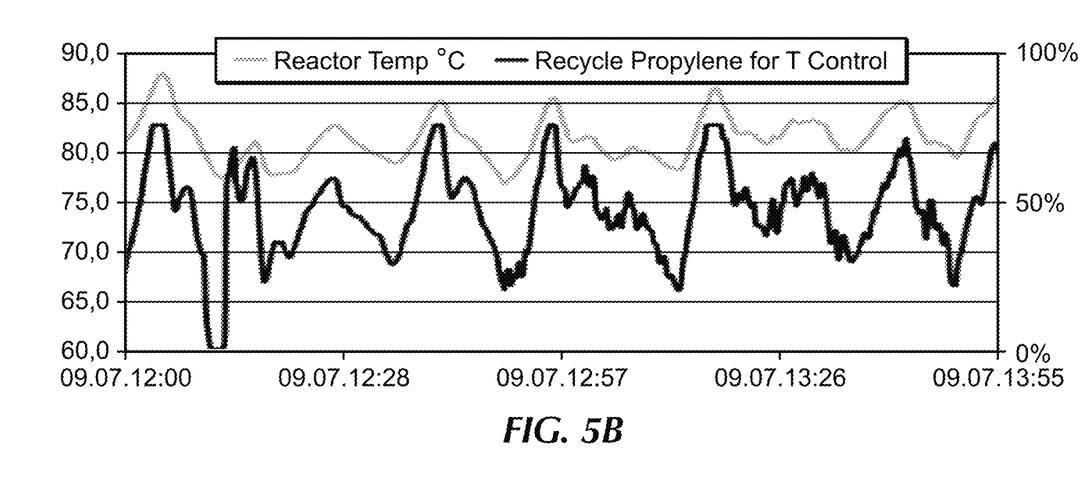
FIG. 5B is a plot of temperature control for polymer reactor having a standard nozzle.

As shown in FIGS. 5A and 5B, the fluctuation in cooling the vessel 100 may be reduced. The centric spray pipe allows the cooling duty to remain in a range of about 20% of the total plot, see FIG. 5A. Unsymmetrical coolant distribution may cause fluctuations in a range of about 50% of the total cooling capacity, see FIG. 5B. Based on the consistent cooling duty, the centric spray pipe in a reactor may have production rates increased by about 15%.

The centric spray pipe 4 may be used in applications which may benefit from circular distribution of liquids onto a powder, liquid, or slurry surface. In some embodiments, the centric spray pipe may be designed (flow and nozzle angles) to apply liquids to a vessel wall. The centric spray pipe 4 integrates liquid distribution and measurement devices (e.g. thermowells, level measurements, quality sensors, etc.).

As one of ordinary skill in this art will also recognize, the centric spray pipe provides broad coverage across the width of the vessel. The centric spray pipe may also contain a measuring guide which may provide consistent measurement readings due to the protection afforded the sensors within the measuring guide.

As described above, when used for polymerizations, the spray nozzles may spray recycle gas from the center of the reactor vessel outward to form circle(s) of coolant in the powder bed below. The coolant circle(s) are intended to shower and cool the maximum amount of powder rising and falling from the impeller into the core region of the reactor. The selected spray nozzles are designed to allow the sprayed recycle gas to penetrate and wet the powder bed from the bed surface down to a desirable depth beneath the surface, and thus to apply direct contact of the liquid cooling media to a larger fraction of the circulated powder. The depth of penetration may range, for example, between 200 and 500 mm. With better cooling coverage, reactor temperature and coolant flow controllability are more steady and stable, leading to better overall reactor performance.

In addition to a recycle gas feed function, the centric feed pipe may also house and protect a radiometric level source(s) and the guide tube(s). The new guide tube(s) may be able to withstand the reactor operating/design pressure and can seal out the recycle gas and reactor content from entering the guide tube(s).

Advantageously, the present inventors have discovered that by providing broad coverage across the width of the vessel, penetration of a liquid into a powder bed may be enhanced along with more efficient temperature control. The present inventors have also found improved level reading capabilities when radiometric sources are located within the centric spray pipe.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. An apparatus comprising:
   a distributor configured to be centrally arranged in a vessel comprising a product, the distributor comprising:
      an upper first section comprising a plurality of spray nozzles configured to distribute a fluid from the upper first section into the product;
      a lower second section configured to be disposed in the product; and
      a guide tube disposed within and traversing the length of the distributor; and
      one or more measurement devices disposed within a portion of the guide tube disposed within the lower second section.

2. The apparatus of claim 1, wherein the plurality of spray nozzles comprises:
   a first level of spray nozzles at a first height along the upper first section;
   a second level of spray nozzles at a second height along the upper first section; and
   a third level of spray nozzles at a third height along the upper first section.

3. The apparatus of claim 2, wherein the first level of spray nozzles comprises a plurality of first nozzles spaced equidistant about the circumference of the upper first section and arranged in a single layer at a first height of the upper first section.

4. The apparatus of claim 3, wherein the first level of spray nozzles comprises fan nozzles.

5. The apparatus of claim 3, wherein the first level of spray nozzles have an angle in the range from about 60° to about 80° from a longitudinal axis of the distributor.

6. The apparatus of claim 2, wherein the second level of spray nozzles comprises a plurality of second nozzles spaced equidistant about the circumference of the upper first section.

7. The apparatus of claim 6, wherein the plurality of second nozzles are arranged at a plurality of heights spaced equidistant along the axial length of the second height along the upper first section.

8. The apparatus of claim 6, wherein the plurality of second nozzles comprises a first layer of second nozzles at a first height along the upper first section, a second layer of second nozzles at a second height along the upper first section and a third layer of second nozzles at a third height along the upper first section.

9. The apparatus of claim 8, wherein the first layer of second nozzles, the second layer of second nozzles and the third layer of second nozzles are offset from each other.

10. The apparatus of claim 2, wherein the second level of spray nozzles comprises straight jet nozzles.

11. The apparatus of claim 10, wherein the plurality of straight jet nozzles in the second level have an angle in the range from about 30° to about 60° from a longitudinal axis of the distributor.

12. The apparatus of claim 10, wherein the third level of spray nozzles comprises a plurality of third nozzles spaced equidistant about the circumference of the upper first section.

13. The apparatus of claim 12, wherein the plurality of third nozzles are arranged at a plurality of heights spaced equidistant along the axial length of the third height along the upper first section.

14. The apparatus of claim 13, wherein the plurality of third nozzles comprises a first layer of third nozzles at a first height along the upper first section, a second layer of third nozzles at a second height along the upper first section and a third layer of third nozzles at a third height along the upper first section.

15. The apparatus of claim 14, wherein the first layer of third nozzles, the second layer of third nozzles and the third layer of third nozzles are offset from each other.

16. The apparatus of claim 2, wherein the third level of spray nozzles comprises straight jet nozzles.

17. The apparatus of claim 16, wherein the plurality of straight jet nozzles in the third level have an angle in the range from about 30° to about 60° from a longitudinal axis of the distributor.

18. The apparatus of claim 1, wherein the upper first section is fluidly isolated from the lower second section.

19. The apparatus of claim 18, wherein the upper first section is fluidly isolated from the lower second section by a dividing plate comprising a hole for passage of the guide tube.

20. The apparatus of claim 19, further comprising one or more seals to seal around the guide tube to prevent flow of fluid from upper first chamber to lower chamber.

21. The apparatus of claim 1, further comprising a vent hole in the portion of the guide tube disposed within the second section.

* * * * *